S. McLaughlin,
Slide Door for Puddling Furnace.
No. 108,501.                    Patented Oct. 18, 1870.
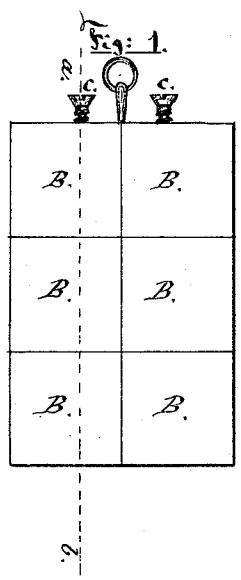
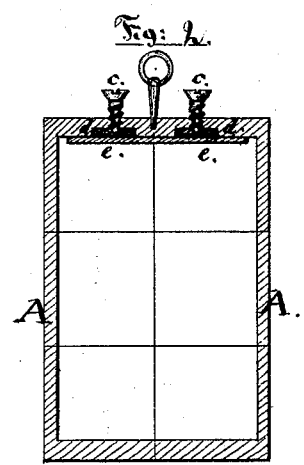
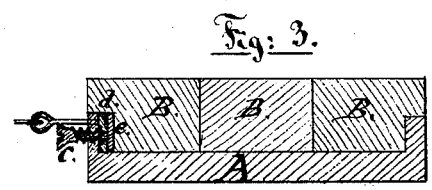
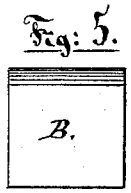
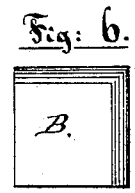
Witnesses:                                   Inventor:
Hermann Spoerkes                             Samuel McLaughlin
Henry Siefenthaler

United States Patent Office.

SAMUEL McLAUGHLIN, OF PHILADELPHIA, PENNSYLVANIA.

Letters Patent No. 108,501, dated October 18, 1870; antedated October 8, 1870.

IMPROVEMENT IN SLIDE-DOORS FOR HEATING AND PUDDLING-FURNACES.

The Schedule referred to in these Letters Patent and making part of the same.

*To all whom it may concern:*

Be it known that I, SAMUEL MCLAUGHLIN, of the city and county of Philadelphia, State of Pennsylvania, have invented a new and useful Improvement in Slide-doors of Heating and Puddling-Furnaces; and I hereby declare the following to be a full and exact description of the construction and operation of the same, reference being had to the annexed drawing making part hereof, in which—

Figure 1 is a front elevation of the same.

Figure 2 is a front elevation of the door, without the flanged fire-bricks.

Figure 3 is a vertical section through the line $a\,b$, fig. 1.

Figures 4, 5, and 6 are elevations of the flanged fire-bricks.

The object of my invention is to protect slide-doors of heating and puddling-furnaces against the speedy destruction by the intense heat to which they are exposed.

For this purpose I line the inner side of the door with a suitable number of flanged fire-bricks, tightened and kept in their places by means of set-screws, nuts and face-plate, in such a manner as to protect every part of the iron of the door from coming in contact with the flame and the heat of the furnace.

Instead of fire-bricks I may also use flanged bricks, made of plaster, soapstone, or any other suitable material which is a slow conductor of heat.

To enable others skilled in the art to make and use my invention, I will proceed to describe its construction and operation.

I construct a cast-iron slide-door, A, in the usual way, either with an aperture or hole at the bottom, or without the same, and provided with flanges on every side, so as to form a hollow shell.

In order to protect the door, and especially the flanges from the heat of the furnace, I construct fire-bricks provided with flanges, as shown in figs. 4, 5, and 6, with which I fill up the space between the flanges of the door and cover the same.

The set-screws $c\,c$, the nuts $d\,d$, and the face-plate $e$, serve to keep the fire-bricks in their place; at the same time this arrangement allows me to take out single bricks when broken or defaced, and to replace them easily by new ones.

I am aware that furnace-doors lined with fire-bricks have been known and used before, but I claim that my device is preferable, because it better protects the iron of the door.

What I claim as my invention, and desire to secure by Letters Patent, is—

The flanged fire-bricks B B B B B B, in combination with the set-screws $c\,c$, the nuts $d\,d$, and the face-plate $e$, arranged substantially in the manner and for the purpose as set forth.

SAMUEL McLAUGHLIN.

Witnesses:
HERMANN SPOERKEY,
HENRY FIEFENTHALER.